United States Patent [19]

Snow et al.

[11] 3,967,524

[45] July 6, 1976

[54] INSULATION BLOCK FASTENER

[76] Inventors: Kenneth T. Snow, 1303 N. Cross St., Wheaton, Ill. 60187; Kenneth T. Snow, Jr., 317 Shagbark Court, Schaumburg, Ill. 60172

[22] Filed: May 1, 1975

[21] Appl. No.: 573,780

[52] U.S. Cl. .................................................. 85/13
[51] Int. Cl.² .................... A43B 23/20; F16B 15/00
[58] Field of Search ................. 85/10 R, 11, 13, 14, 85/15, 17, 21, 30, 49; 402/14, 15

[56] References Cited
UNITED STATES PATENTS

| | | | |
|---|---|---|---|
| 1,247,933 | 11/1917 | Colpitts | 85/17 |
| 2,242,967 | 5/1941 | Carlile | 85/17 |
| 2,895,369 | 7/1959 | Andersen | 85/11 |
| 3,143,030 | 8/1964 | Muller | 85/13 |

Primary Examiner—G. V. Larkin
Attorney, Agent, or Firm—Kenneth T. Snow

[57] ABSTRACT

A fastener for joining insulation blocks to a wall of a refrigerator or cold storage chamber. The fastener is provided with a central flat back which is fastened by means of nails or the like to a concrete or other rigid wall. The fastener is also provided with a plurality of thin in-line spikes at each side of the central flat back and projecting outwardly therefrom in two parallel lines. The spikes are then preferably covered with an adhesive and an insulation block pressed onto the adhesive covered spikes. The adhesive seals the spike opening into the insulation block resulting in maximum insulation and a perfect and secure holding of the insulation block to the rigid wall. The elongated thin spikes are preferably undercut at their inner ends to act as barbs in the more secure holding of the spikes within the insulation block.

2 Claims, 5 Drawing Figures

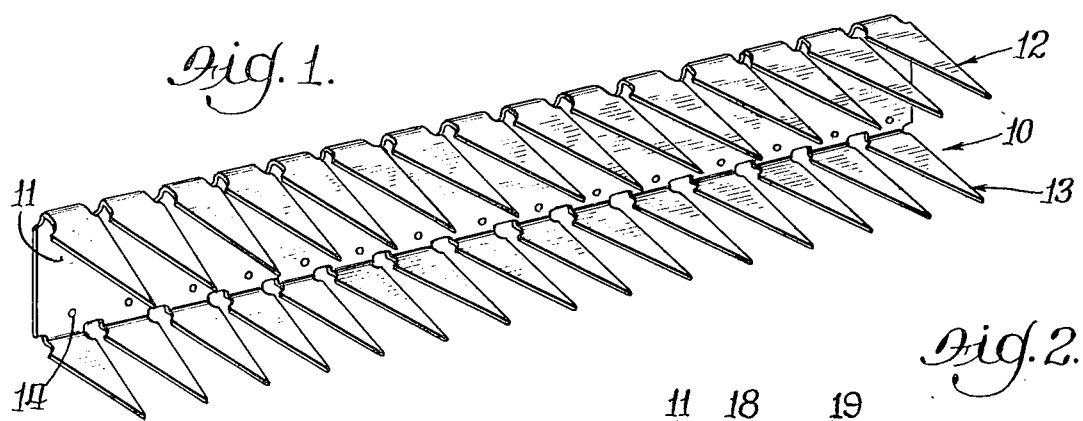
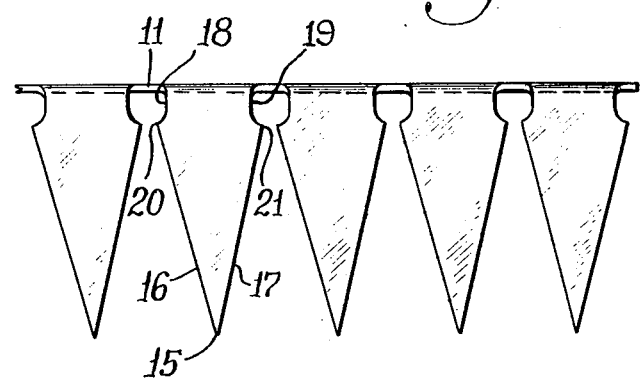
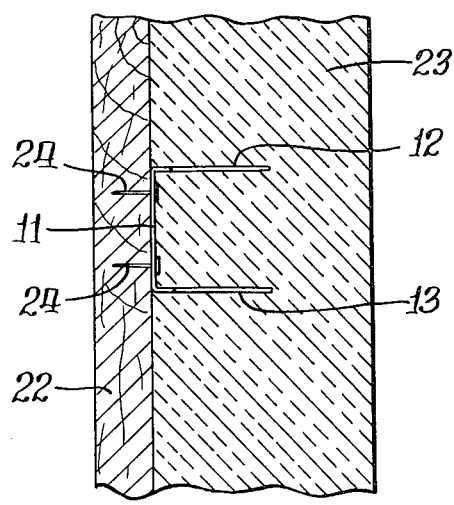
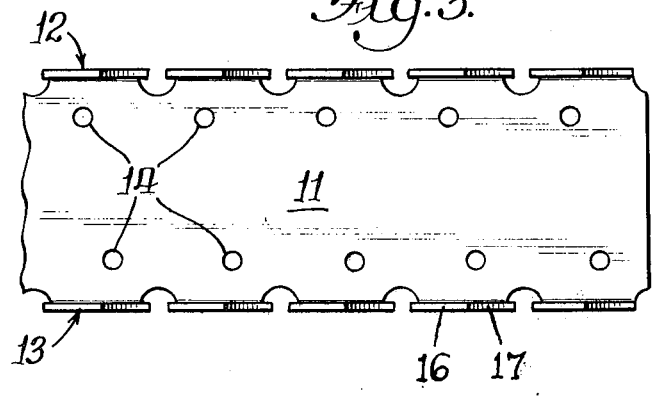
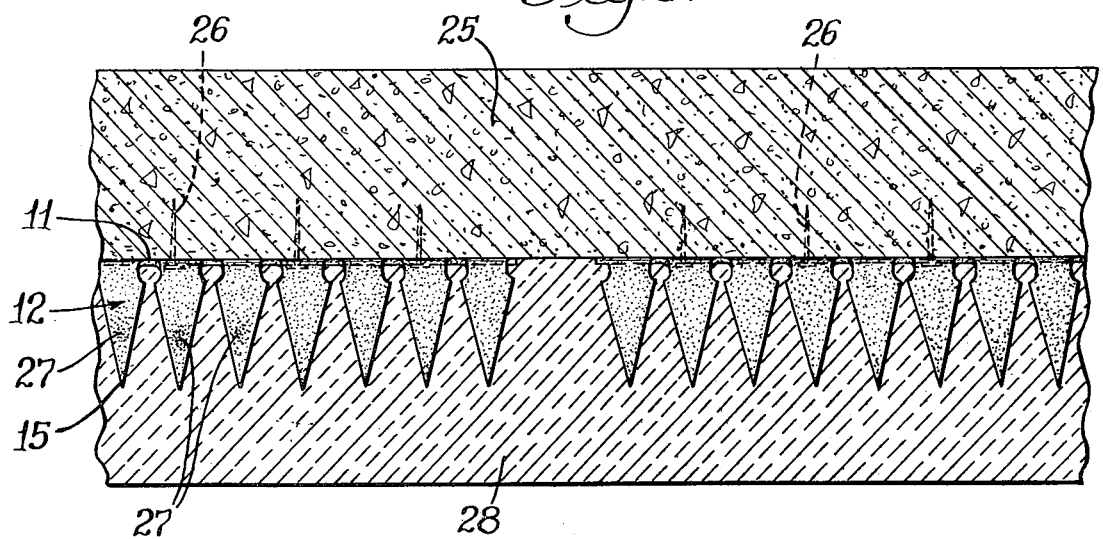

INSULATION BLOCK FASTENER

BACKGROUND OF THE INVENTION

In walk-in refrigerators, freezers, or cold storage rooms the insulation therefor is extremely important. Here the type of insulation is of the block type rather than a fibrous type. Block insulations such as polyurethane, polystyrene, cork, or the like must be securely fastened to rigid walls which in most instances are made of concrete although they can be made of other materials such as wood, steel, or even plastic. The securing of the block insulation pieces to the walls of such a chamber has usually been done by just a cement. Under such a construction continued adherence of the insulation block to the cold chamber walls is questionable. Oftentimes the block falls off and the effectiveness of the cold chamber is immediately lost. Clips and fasteners of many designs have been tried but all found wanting. Such devices usually tore the fragile insulation block to materially reduce its effectiveness and they were not capable of physically holding the block to the rigid wall. Now, with the present invention the parallel rows of thin, elongated spikes which are securely fastened to the rigid wall by a central back plate, easily penetrate into the insulation block for a substantial distance and with the aid of an adhesive coating and inner end undercutting on the spikes the block is fixedly secured to the rigid wall with no opportunity of coming loose and positively sealing the insulation block around the elongated spikes.

SUMMARY OF THE INVENTION

A principal object of this invention is to provide a novel fastener for joining block insulation members to the rigid walls of a chamber, such as a cold storage chamber.

An important object of this invention is to provide novel means for securely fastening block insulation to a rigid wall without in any way disturbing the insulating qualities of the insulation and insuring the nonseparation of the porous insulating block from the rigid wall.

Another important object of this invention is to provide a novel U-shaped fastener in which the legs of the U-form parallel rows of a series of elongated, thin sharp flat spikes and the connecting portion of the U forming a flat back by which the U is attached to a rigid wall and the spikes are adapted to penetrate a porous insulation block.

Other and further important objects and advantages will become apparent from the disclosures in the following specificaton and the accompanying drawings.

In the drawings:

FIG. 1 is a perspective view of the block insulation fastener of this invention.

FIG. 2 is a top plan view of a portion of the fastener as shown in FIG. 1.

FIG. 3 is a front elevational view of the fastener of FIGS. 1 and 2.

FIG. 4 is a vertical sectional view taken through a rigid wall and a block insulation thereon with the fastener of this invention joining the block insulation to the rigid wall.

FIG. 5 is a horizontal sectional view taken through a rigid wall, in this instance concrete, and a block insulation covering thereon with the fastener of this invention joining the block insulation to the rigid concrete wall.

As shown in the drawings:

The reference numeral 10 indicates generally the insulation block fastener of this invention. The fastener 10 is U-shaped in cross section and includes a centrally disposed back wall 11 which is generally vertically disposed for flush abutment with any rigid wall to which block or panel insulation members are to be attached. The fastener 10 further includes a first row or series of thin, flat, pointed spikes 12 which project forwardly from the top of the centrally disposed vertical back wall 11. The spikes 12 are disposed at generally right angles to the flat back 11. The fastener 10 further includes a spaced apart second row or series of thin, flat, pointed spikes 13 which project forwardly from the bottom of the centrally disposed back wall 11. Here again the spikes 13 are disposed at right angles to the back wall and are generally parallel to the first row of spikes 12. Thus the fastener comprises the U-shaped members of a bottom wall 11, and outwardly projecting parallel, spaced apart rows of spikes 12 and 13. The back wall 11 is provided with a plurality of spaced apart nail receiving holes 14. It is through these nail holes 14 that the fastener 10 is attached to a rigid wall regardless of the material with which that rigid wall is made. The rigid wall may be wood, metal, plastic, concrete, etc.

Each elongated flat spike 12 and 13 is provided at its outer end with an insulation block penetrating sharp point 15 with outwardly diverging side edges 16 and 17. At the inner ends of the side edges 16 and 17 there is provided spaced apart undercuts 18 and 19. These undercuts are located at the juncture of the tapering side edges with the back wall 11. The undercuts 18 and 19 form barbs 20 and 21 on each side edge 16 and 17 respectively.

As shown in FIG. 4 the rigid wall is identified as numeral 22 and can be made of any desired material. In this instance the wall is shown as being wood. A block insulation panel 23 of polyurethane, polystyrene, cork, or other similar insulating material is shown lying flush against the rigid wall 22. The fastener 10 of this invention has been preliminarily attached to the rigid wall 22 by nails 24 or other suitable fasteners. The nails are preferably driven through the nail receiving holes 14, but of course nails or fasteners can be driven directly through the relatively thin gauge steel from which the fastener is made. The panel or block of porous insulation is then pressed directly on the plurality of sharp points 15 of the plurality of nails 12 and 13 until the full lengths of the thin, flat spikes are fully embedded in the insulation block and the block lies in close abutting relationship with the rigid wall 22. The barbs 20 and 21 act to resist the ready removal of the insulation block from the flat spikes in the same manner as the barbs of a fishhook resist coming out of a fish.

The use of this insulation fastener is primarily in cold storage, refrigerator or freezer rooms where it is desired to have highly efficient insulation covering the interior walls of the walk-in type of storage or freezer chamber. Heretofore, the principal means of attaching block insulation to the walls of such freezers was by adhesives or cements and these have always had dubious retentive abilities when subjected to the extreme colds of freezing or cold storage chambers of this type. Now, with this mechanical interlock between the rigid wall and the insulation block there is little if any possibility of the insulation block becoming loosened from the rigid wall.

As best shown in FIG. 5 the chamber wall 25 is made of concrete. It it preferable that the fasteners 10 be attached to the concrete wall 25 by means of nails or other fasteners 26 being power driven into and through the back wall 11 and thence into the concrete wall 25. This securely holds the fasteners to the concrete with the spikes 12 and 13 projecting outwardly therefrom at right angles. One fastener or numerous fasteners may be used depending on the size of the insulation block to be attached thereto. The fastener strips 10 are preferably arranged in a horizontal direction so after the insulation block is attached thereover the wide flat portions of the thin spikes 12 and 13 resist the downward pulling of the insulation from the rigid wall 25. When the fasteners 10 are attached to the concrete wall 25 it is preferable that they be coated with an adhesive or cement 27. This may be done by a brush or by spraying. When the adhesive is still in a soft state the insulation block 28 is pressed onto the plurality of spikes 12 and 13. The thin flat spikes slide into the insulation block the full length of the elongated spikes until the block 28 abuts the rigid wall 25. Given a short time to set, the adhesive securely locks the block 28 to the fastener spikes and thus there is not only a physical locking of the block 28 to the wall 25 but also an adhesive fastening. The adhesive performs still another function and that is the sealing of the insulation block around the slit like openings formed therein by the penetration of the thin spikes. Thus even around the spikes the insulation block has its full insulation qualities retained by reason of the sealing of the block by the adhesive around the spikes 12 and 13. Here again, as in the device of FIG. 4, the barbs 20 and 21 extending outwardly from the undercuttings 18 and 19 act to prevent withdrawal of the insulation block 28 from the fastener 10 and thus the wall 25. The use of an adhesive increases the effectiveness of the barbs and their undercuts.

We are aware that numerous details of construction may be made throughout a wide range without departing from the principles disclosed herein and we therefore do not intend limiting the patent granted hereon otherwise than as necessitated by the appended claims.

What is claimed is:

1. A metal fastener made of relatively thin metal for holding an insulation block to a rigid surface, said fastener having a flat back adapted to lie flush against the rigid surface, means fastening said flat back to the rigid surface, said fastener including tapered spikes bent at right angles from both sides of said flat back and extending in the same direction and lying generally parallel to each other, the thickness of said spikes being only the thickness of the metal and having a sharp point at their outer ends and being broad near their inner ends, whereby when said spikes are covered with an adhesive and an insulating block is pressed onto the spikes the insulating block is fixedly and firmly attached to said rigid surface.

2. A device as set forth in claim 1 in which said spikes have undercuts at their junctures with the flat back of the fastener forming barbs on each side of each spike.

* * * * *